United States Patent
Yanagisawa

(10) Patent No.: US 10,072,112 B2
(45) Date of Patent: Sep. 11, 2018

(54) DISPERSANT AND METHOD FOR PRODUCING SAME, INK, AND METHOD FOR FORMING ELECTRO-CONDUCTIVE PATTERN

(71) Applicant: Masahiro Yanagisawa, Kanagawa (JP)

(72) Inventor: Masahiro Yanagisawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 394 days.

(21) Appl. No.: 14/458,414

(22) Filed: Aug. 13, 2014

(65) Prior Publication Data

US 2015/0069306 A1    Mar. 12, 2015

(30) Foreign Application Priority Data

Sep. 11, 2013  (JP) .................. 2013-188299
Jul. 9, 2014   (JP) .................. 2014-141448

(51) Int. Cl.
| | | |
|---|---|---|
| H01B 1/02 | (2006.01) |
| C08F 220/28 | (2006.01) |
| C09D 11/52 | (2014.01) |
| C09D 11/107 | (2014.01) |
| C09D 11/326 | (2014.01) |

(52) U.S. Cl.
CPC .......... *C08F 220/28* (2013.01); *C09D 11/107* (2013.01); *C09D 11/326* (2013.01); *C09D 11/52* (2013.01); *H01B 1/02* (2013.01)

(58) Field of Classification Search
CPC ...................................................... H01B 1/02
See application file for complete search history.

(56) References Cited

U.S. PATENT DOCUMENTS

| 6,262,152 | B1* | 7/2001 | Fryd | .................. B01F 17/00 523/205 |
| 2004/0102541 | A1 | 5/2004 | Sacoto et al. | |
| 2007/0105979 | A1 | 5/2007 | Sun | |
| 2008/0029766 | A1 | 2/2008 | Onodera et al. | |
| 2008/0236444 | A1* | 10/2008 | Enciu | .................. C09D 11/30 106/31.13 |
| 2008/0286488 | A1 | 11/2008 | Li et al. | |
| 2013/0070036 | A1* | 3/2013 | Ooishi | .................. C09D 11/101 347/102 |

FOREIGN PATENT DOCUMENTS

| JP | 2008-060544 | 3/2008 |
| JP | 2010-528428 | 8/2010 |
| JP | 2013-230416 | 11/2013 |

OTHER PUBLICATIONS

Extended European Search Report dated Mar. 18, 2015 in Patent Application No. 14183970.4.
U.S. Appl. No. 14/174,283, filed Feb. 6, 2014.

* cited by examiner

*Primary Examiner* — William Young
(74) *Attorney, Agent, or Firm* — Oblon, McClelland, Maier & Neustadt, L.L.P.

(57) ABSTRACT

Provided is a dispersant used for dispersion of metal particles, the dispersant including: a constituent unit derived from a compound represented by General Formula (I) below; and a constituent unit derived from a compound having an ionic group,

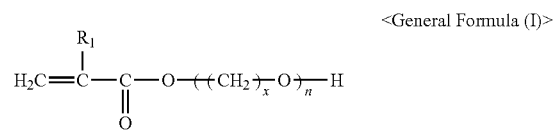

<General Formula (I)> where in General Formula (I) above, $R_1$ is a hydrogen atom or a methyl group, x is a natural number of 2 or greater, and n is a natural number of 1 or greater.

11 Claims, No Drawings

DISPERSANT AND METHOD FOR PRODUCING SAME, INK, AND METHOD FOR FORMING ELECTRO-CONDUCTIVE PATTERN

BACKGROUND OF THE INVENTION

Field of the Invention

The present invention relates to a dispersant and a method for producing the same, an ink, and a method for forming an electro-conductive pattern.

Description of the Related Art

Conventionally, photolithography, etching, etc. have been used as methods for forming an electro-conductive pattern such as a trace and an antenna on a substrate. However, these methods are problematic in terms of the number of steps in the process, efficiency of use of materials, etc., and also costly.

Hence, there is known a method for forming an electro-conductive pattern by using a printing method such as an inkjet printing method (e.g., see Japanese Patent Application Laid-Open (JP-A) No. 2008-60544).

The inkjet printing method is a method of printing an ink on a substrate according to an inkjet method, and then drying and calcinating the ink.

As an ink, a nano metal ink in which metal particles having a primary particle diameter on nm order are dispersed in a dispersion medium is known.

For example, as a method for forming an electro-conductive film, there is proposed a method that includes a step of depositing a film containing a plurality of kinds of copper nanoparticles on the surface of a substrate, and a step of exposing at least a portion of the film to light to impart electro-conductivity to the exposed portion (see Japanese Patent Application Laid-Open (JP-A) No. 2010-528428). The film is deposited from a solution that contains a solvent and a dispersant.

However, the proposed method has a problem that the volume resistivity of the exposed portion will be high. Therefore, it is requested to provide a dispersant that enables formation of an electro-conductive thin film or pattern having a low volume resistivity.

SUMMARY OF THE INVENTION

The present invention aims to provide a dispersant that enables formation of an electro-conductive thin film or pattern having a low volume resistivity.

A dispersant of the present invention as a solution to the problem described above is a dispersant used for dispersion of metal particles, and includes:
a constituent unit derived from a compound represented by General Formula (I) below; and
a constituent unit derived from a compound having an ionic group,

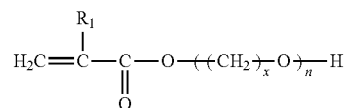

where in General Formula (I) above, $R_1$ is a hydrogen atom or a methyl group, x is a natural number of 2 or greater, and n is a natural number of 1 or greater.

The present invention can provide a dispersant that can solve the conventional problems described above and achieve the object described above, and enables formation of an electro-conductive thin film or pattern having a low volume resistivity.

DETAILED DESCRIPTION OF THE INVENTION (Dispersant)

The dispersant of the present invention is used for dispersion of metal particles, and contains a constituent unit derived from a compound represented by General Formula (I) below, and a constituent unit derived from a compound having an ionic group.

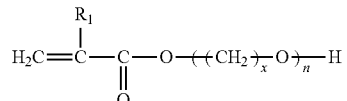
<General Formula (I)>

In General Formula (I) above, $R_1$ is a hydrogen atom or a methyl group.

x is a natural number of 2 or greater, and preferably from 2 to 12.

n is a natural number of 1 or greater, and preferably from 1 to 12.

When n is 1, x is preferably from 2 to 12.

When n is a natural number of 2 or greater, x is preferably 2 or 3.

<Constituent Unit Derived from Compound Represented by General Formula (I)>

Examples of the compound represented by General Formula (I) above when n is 1 and x is from 2 to 12 include: methacrylate-based monomer such as hydroxyethyl methacrylate, hydroxypropyl methacrylate, hydroxybutyl methacrylate, hydroxyhexyl methacrylate, hydroxyoctyl methacrylate, hydroxydecyl methacrylate, and hydroxydodecyl methacrylate; and acrylate-based monomer such as hydroxyethyl acrylate, hydroxypropyl acrylate, hydroxybutyl acrylate, and hydroxyhexyl acrylate. One of these may be used alone, or two or more of these may be used in combination.

Examples of the compound represented by General Formula (I) above when n is a natural number of 2 or greater and x is 2 or 3 includes: methacrylate-based monomer such as diethylene glycol methacrylate, triethylene glycol methacrylate, tetraethylene glycol methacrylate, polyethylene glycol methacrylate, and polypropylene glycol methacrylate; and acrylate-based monomer such as diethylene glycol acrylate, triethylene glycol acrylate, tetraethylene glycol acrylate, polyethylene glycol acrylate, and polypropylene glycol acrylate. One of these may be used alone, or two or more of these may be used in combination.

<Constituent Unit Derived from Compound Having Ionic Group>

The ionic group of the compound having an ionic group is not particularly limited, and an appropriate one may be selected according to the purpose. Examples thereof include an amino group or a salt thereof, a carboxyl group or a salt thereof, a sulfo group or a salt thereof, and a phospho group or a salt thereof. One of these may be used alone, or two or more of these may be used in combination. Among these, an amino group, a carboxyl group, a sulfo group, and a phospho group are preferable in terms of adsorptivity to metal particles.

The compound having the amino group is not particularly limited, and an appropriate one may be selected according to the purpose. Examples thereof include N-methylaminoethyl (meth)acrylate, N-ethylaminoethyl (meth)acrylate, N,N-dimethylaminoethyl (meth)acrylate, N,N-diethylaminoethyl (meth)acrylate, N,N-dibutylaminoethyl acrylate, N,N-di-tert-butylaminoethyl acrylate, N-phenylaminoethyl methacrylate, N,N-diphenylaminoethyl methacrylate, allyl amine, 4-aminostyrene, 4-N,N-dimethylamino styrene, N-methylaminoethyl styrene, dimethylaminoethoxy styrene, diphenylaminoethyl styrene, N-phenylaminoethyl styrene, 2-N-piperidylethyl (meth)acrylate, 2-vinylpyridine, 4-vinylpyridine, and 2-vinyl-6-methylpyridine.

The compound having the carboxyl group is not particularly limited, and an appropriate one may be selected according to the purpose. Examples thereof include (meth)acrylic acid, maleic acid, maleic anhydride, itaconic acid, itaconic anhydride, fumaric acid, cinnamic acid, crotonic acid, vinyl benzoic acid, 2-methcryloxyethyl succinic acid, 2-methacryloxyethyl maleic acid, 2-methacryloxyethyl hexahydrophthalic acid, and 2-methacryloxyethyl trimellitic acid.

The compound having the sulfo group is not particularly limited, and an appropriate one may be selected according to the purpose. Examples thereof include vinyl sulfonic acid, allyl sulfonic acid, styrene sulfonic acid, and 2-acrylamide-2-methylpropane sulfonic acid.

The compound having the phospho group is not particularly limited, and an appropriate one may be selected according to the purpose. Examples thereof include 3-(meth)acryloxypropyl phosphonic acid.

The dispersant has a group represented by General Formula (A) below on the side chain thereof. Therefore, it is easily decomposable when calcinated, and is considered to be able to enable formation of an electro-conductive thin film or pattern having a low volume resistivity. Note that the group represented by General Formula (A) is also considered to contribute to solubility in a dispersion medium in which metal particles are dispersed.

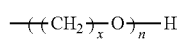
<General Formula (A)> where x is a natural number of 2 or greater, and n is a natural number of 1 or greater.

Since the dispersant contains a constituent unit derived from a compound having an ionic group, it can adsorb to metal particles. Note that because the dispersant has a polymer chain, it can suppress aggregation of metal particles based on steric hindrance.

The number average molecular weight of the dispersant is not particularly limited, and may be appropriately selected according to the purpose. For example, it is preferably from 5,000 to 100,000.

The number average molecular weight can be measured according to gel permeation chromatography (GPC).

(Method for Producing Dispersant)

A method for producing the dispersant of the present invention includes a polymerizing step, and further includes other steps according to necessity.

<Polymerizing Step>

The polymerizing step is a step of polymerizing a composition that contains the compound represented by General Formula (I) above and a compound having the ionic group.

In addition to the compound represented by General Formula (I) above and the compound having the ionic group, the composition may contain other components. The other components are not particularly limited, and appropriate ones may be selected according to the purpose. Examples thereof include a polymerization initiator, a solvent, etc.

In synthesizing the dispersant, the molar ratio A/B of a compound A represented by General Formula (I) above to a compound B having the ionic group is not particularly limited, and may be appropriately selected based on a balance between adsorptivity of the dispersant to metal particles and steric hindrance. However, the molar ratio A/B is preferably from 9 to 999, and more preferably from 20 to 100.

When the ionic group of the compound having an ionic group is a salt of an amino group, a carboxyl group, a sulfo group, or a phospho group, it is possible to synthesize the dispersant by polymerizing the composition containing the compound represented by General Formula (I) above and the compound having an amino group, a carboxyl group, a sulfo group, or a phospho group, and after this neutralizing the resultant.

<Other Steps>

The other steps are not particularly limited, and appropriate ones may be selected according to the purpose. Examples thereof include a neutralizing step, a refining step, etc.

(Ink)

An ink of the present invention is used for formation of an electro-conductive pattern, contains the dispersant of the present invention, metal particles, and dispersion medium, and further contains other components according to necessity.

<Dispersant>

The content of the dispersant of the present invention in the ink is not particularly limited, and may be appropriately selected according to the purpose. However, it is preferably from 1 part by mass to 20 parts by mass relative to 100 parts by mass of the dispersion medium.

<Dispersion Medium>

The dispersion medium is not particularly limited, and an appropriate one may be selected according to the purpose as long as it can disperse metal particles. Examples thereof include an organic solvent. As the organic solvent, a polar organic solvent is preferable, and monoalkyl glycol ether, glycol monoalkyl ether ester, or dialkyl glycol ether is more preferable in terms of solubility of the dispersant.

The monoalkyl glycol ether is not particularly limited, and an appropriate one may be selected according to the purpose. Examples thereof include: ethylene glycol-based ether such as ethylene glycol monomethyl ether, ethylene glycol monoethyl ether, ethylene glycol monopropyl ether, ethylene glycol monobutyl ether, ethylene glycol monohexyl ether, ethylene glycol mono-2-ethyl butyl ether, diethylene glycol monomethyl ether, diethylene glycol monoethyl ether, diethylene glycol monopropyl ether, diethylene glycol monobutyl ether, and diethylene glycol monohexyl ether; and propylene glycol-based ether such as propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, tripropylene glycol monomethyl ether, and tripropylene glycol monobutyl ether.

The glycol monoalkyl ether ester is not particularly limited, and an appropriate one may be selected according to the purpose. Examples thereof include diethylene glycol monomethyl ether acetate, diethylene glycol monoethyl ether acetate, and diethylene glycol monobutyl ether acetate.

The dialkyl glycol ether is not particularly limited, and an appropriate one may be selected according to the purpose. Examples thereof include ethylene glycol dimethyl ether, ethylene glycol diethyl ether, diethylene glycol dimethyl ether, triethylene glycol dimethyl ether, tetraethylene glycol dimethyl ether, and dipropylene glycol dimethyl ether.

<Metal Particles>

The metal particles are not particularly limited, except that it should be able to form an electro-conductive pattern. Examples thereof include copper particles, silver particles, and nickel particles.

The average particle diameter of the metal particles is preferably from 2 nm to 100 nm, and more preferably from 5 nm to 50 nm.

The average particle diameter of the metal particles can be measured according to, for example, a dynamic light scattering method.

The content of the metal particles in the ink is not particularly limited, and may be appropriately selected according to the purpose. However, it is preferably from 10 parts by mass to 50 parts by mass relative to 100 parts by mass of the dispersion medium.

A disperser used for dispersing the metal particles in the dispersion medium is not particularly limited, and an appropriate one may be selected according to the purpose. Examples thereof include a homogenizer, a ball mill, a sand mill, and attritor.

(Method for Forming Electro-Conductive Pattern)

The method for forming an electro-conductive pattern of the present invention includes an applying step and a calcinating step, and further includes other steps according to necessity.

The electro-conductive pattern encompasses an electro-conductive thin film on which no pattern is formed.

<Applying Step>

The applying step is a step of applying the ink of the present invention on a substrate.

The substrate is not particularly limited, and an appropriate one may be selected according to the purpose. Examples thereof include: a polymer substrate such as a glass substrate, a quartz substrate, a silicon substrate, a $SiO_2$ film-coated silicon substrate, a polyethylene terephthalate substrate, a polycarbonate substrate, a polystyrene substrate, and a polymethyl methacrylate substrate; and an inkjet recording medium such as an ink receiving layer-including film (OHP sheet) and an ink receiving layer-including sheet. One of these may be used alone, or two or more of these may be used in combination.

The substrate may be an appropriately synthesized product or may be a commercially available product.

The thickness of the substrate is not particularly limited, and may be appropriately selected. It is preferably 100 μm or greater, and more preferably 500 μm or greater.

The method for applying the ink is not particularly limited, and an appropriate method may be selected according to the purpose. Examples thereof include a spin coating method, an inkjet method, a gravure printing method, and a screen printing method. Among these, an inkjet method is preferable because it can pattern the target directly.

<Calcinating Step>

The calcinating step is a step of calcinating the ink applied on the substrate.

When the ink applied on the substrate is calcinated, the metal particles fuse with each other, and the interface between the metal particles can disappear.

The method for calcinating the ink applied on the substrate is not particularly limited, and an appropriate method may be selected according to the purpose as long as it can make the metal particles fuse with each other. Examples thereof include heat calcination and light calcination. Of these, light calcination is preferable because it can suppress damages to the substrate.

The temperature at which the ink applied on the substrate is subjected to light calcination is preferably 200° C. or lower, and more preferably 150° C. or lower.

The light source used for the light calcination is not particularly limited, and an appropriate one may be selected according to the purpose. Examples thereof include a xenon lamp.

Note that it is preferable to heat and dry the ink applied on the substrate before calcinating it.

An electro-conductive pattern obtained by the method for forming an electro-conductive pattern of the present invention using the ink of the present invention containing the dispersant of the present invention will have a low volume resistivity and excellent electro-conductivity regardless of whether heat calcination or light calcination.

The volume resistivity of the electro-conductive pattern is preferably $1\times10^{-4}$ Ω·cm or less, and more preferably $1\times10^{-5}$ Ω·cm or less. When the volume resistivity is greater than $1\times10^{-4}$ Ω·cm, it may have to be considered as a resistive element tin the circuit.

The volume resistivity can be calculated by measuring the electric resistance and the thickness of the electro-conductive pattern with a resistivity meter (e.g., LORESTA manufactured by Mitsubishi Chemical Corporation), and a profilometer (e.g., ALPHA-STEP manufactured by KLA Tencor Corporation).

EXAMPLES

Examples of the present invention will be explained below. The present invention is not limited to these Examples by any means.

Example 1

—Synthesis of Dispersant 1—

Ethanol (300 parts by mass) was put in a reaction vessel equipped with a stirrer, a thermometer, and a reflux condenser, and heated to 60° C. under nitrogen purge. Next, a mixture solution of hydroxyethyl methacrylate (90 parts by mass), methacrylic acid (10 parts by mass), and azobis dimethylvaleronitrile (1 part by mass) as a polymerization initiator was dropped thereto in 1 hour, and they were stirred at 60° C. for 5 hours. Then, ethanol was evaporated with an evaporator, to thereby obtain a dispersant 1.

Example 2

—Synthesis of Dispersant 2—

The dispersant 2 was obtained in the same manner as in Example 1, except that hydroxyethyl acrylate (99 parts) and N,N-dimethylaminoethyl acrylate (1 part by mass) were used instead of hydroxyethyl methacrylate (90 parts by mass) and methacrylic acid (10 parts by mass) of Example 1.

Example 3

—Synthesis of Dispersant 3—

The dispersant 3 was obtained in the same manner as in Example 1, except that hydroxypropyl methacrylate (99 parts by mass) and 2-acrylamide-2-methylpropane sulfonic acid (1 part by mass) were used instead of hydroxyethyl methacrylate (90 parts by mass) and methacrylic acid (10 parts by mass) of Example 1.

Example 4

—Synthesis of Dispersant 4—

The dispersant 4 was obtained in the same manner as in Example 1, except that hydroxypropyl acrylate (95 parts by mass) and 3-methacryloxypropyl phosphonic acid (5 parts by mass) were used instead of hydroxyethyl methacrylate (90 parts by mass) and methacrylic acid (10 parts by mass) of Example 1.

Example 5

—Synthesis of Dispersant 5—

The dispersant 5 was obtained in the same manner as in Example 1, except that hydroxybutyl methacrylate (95 parts by mass) and methacrylic acid (5 parts by mass) were used instead of hydroxyethyl methacrylate (90 parts by mass) and methacrylic acid (10 parts by mass) of Example 1.

Example 6

—Synthesis of Dispersant 6—

The dispersant 6 was obtained in the same manner as in Example 1, except that hydroxybutyl acrylate (99 parts by mass) and acrylic acid (1 part by mass) were used instead of hydroxyethyl methacrylate (90 parts by mass) and methacrylic acid (10 parts by mass) of Example 1.

Example 7

—Synthesis of Dispersant 7—

The dispersant 7 was obtained in the same manner as in Example 1, except that hydroxyhexyl methacrylate (95 parts by mass) and methacrylic acid (5 parts by mass) were used instead of hydroxyethyl methacrylate (90 parts by mass) and methacrylic acid (10 parts by mass) of Example 1.

Example 8

—Synthesis of Dispersant 8—

The dispersant 8 was obtained in the same manner as in Example 1, except that hydroxyhexyl acrylate (99 parts by mass) and N,N-diethylaminoethyl methacrylate (1 part by mass) were used instead of hydroxyethyl methacrylate (90 parts by mass) and methacrylic acid (10 parts by mass) of Example 1.

Example 9

—Synthesis of Dispersant 9—

The dispersant 9 was obtained in the same manner as in Example 1, except that hydroxyoctyl methacrylate (95 parts by mass) and acrylic acid (5 parts by mass) were used instead of hydroxyethyl methacrylate (90 parts by mass) and methacrylic acid (10 parts by mass) of Example 1.

Example 10

—Synthesis of Dispersant 10—

The dispersant 10 was obtained in the same manner as in Example 1, except that hydroxydecyl methacrylate (99 parts by mass) and allyl amine (1 part by mass) were used instead of hydroxyethyl methacrylate (90 parts by mass) and methacrylic acid (10 parts by mass) of Example 1.

Example 11

—Synthesis of Dispersant 11—

The dispersant 11 was obtained in the same manner as in Example 1, except that hydroxydodecyl methacrylate (90 parts by mass) was used instead of hydroxyethyl methacrylate (90 parts by mass) of Example 1.

Example 12

—Synthesis of Dispersant 12—

The dispersant 12 was obtained in the same manner as in Example 1, except that polyethylene glycol methacrylate (where n in General Formula (I) was from 4 to 5) (90 parts by mass) and methacrylic acid (10 parts by mass) were used instead of hydroxyethyl methacrylate (90 parts by mass) and methacrylic acid (10 parts by mass) of Example 1.

Example 13

—Synthesis of Dispersant 13—

The dispersant 13 was obtained in the same manner as in Example 1, except that diethylene glycol acrylate (99 parts by mass) and N,N-dimethylaminoethyl acrylate (1 part by mass) were used instead of hydroxyethyl methacrylate (90 parts by mass) and methacrylic acid (10 parts by mass) of Example 1.

Example 14

—Synthesis of Dispersant 14—

The dispersant 14 was obtained in the same manner as in Example 1, except that polypropylene glycol methacrylate (where n in General Formula (I) was from 7 to 8) (99 parts by mass) and 2-acrylamide-2-methylpropane sulfonic acid (1 part by mass) were used instead of hydroxyethyl methacrylate (90 parts by mass) and methacrylic acid (10 parts by mass) of Example 1.

Example 15

—Synthesis of Dispersant 15—

The dispersant 15 was obtained in the same manner as in Example 1, except that polyethylene glycol acrylate (where n in General Formula (I) was from 4 to 5) (95 parts by mass) and 3-methacryloxypropyl phosphonic acid (5 parts by mass) were used instead of hydroxyethyl methacrylate (90 parts by mass) and methacrylic acid (10 parts by mass) of Example 1.

Data about the dispersants of Examples 1 to 15 are collectively shown in Table 1.

TABLE 1

| | Dispersant | Compound represented by General Formula (I) Kind | Content (part by mass) | Compound having ionic group Kind | Content (part by mass) |
|---|---|---|---|---|---|
| Ex. 1 | 1 | Hydroxyethyl methacrylate | 90 | Methacrylic acid | 10 |
| Ex. 2 | 2 | Hydroxyethyl acrylate | 99 | N,N-dimethylaminoethyl acrylate | 1 |
| Ex. 3 | 3 | Hydroxypropyl methacrylate | 99 | 2-acrylamide-2-methyl propane sulfonic acid | 1 |
| Ex. 4 | 4 | Hydroxypropyl acrylate | 95 | 3-methacryloxypropyl sulfonic acid | 5 |
| Ex. 5 | 5 | Hydroxybutyl methacrylate | 95 | Methacrylic acid | 5 |
| Ex. 6 | 6 | Hydroxybutyl acrylate | 99 | Acrylic acid | 1 |
| Ex. 7 | 7 | Hydroxyhexyl methacrylate | 95 | Methacrylic acid | 5 |
| Ex. 8 | 8 | Hydroxyhexyl acrylate | 99 | N,N-diethylaminoethyl methacrylate | 1 |
| Ex. 9 | 9 | Hydroxyoctyl methacrylate | 95 | Acrylic acid | 5 |
| Ex. 10 | 10 | Hydroxydecyl methacrylate | 99 | Allyl amine | 1 |
| Ex. 11 | 11 | Hydroxydodecyl methacrylate | 90 | Methacrylic acid | 10 |
| Ex. 12 | 12 | Polyethylene glycol methacrylate | 90 | Methacrylic acid | 10 |
| Ex. 13 | 13 | Diethylene glycol acrylate | 99 | N,N-dimethylaminoethyl acrylate | 1 |
| Ex. 14 | 14 | Polypropylene glycol methacrylate | 99 | 2-acrylamide-2-methyl propane sulfonic acid | 1 |
| Ex. 15 | 15 | Polyethylene glycol acrylate | 95 | 3-methacryloxypropyl sulfonic acid | 5 |

In Examples and Comparative Examples below, the average particle diameter of an ink was measured as described below.

<Average Particle Diameter of Ink>

The average particle diameter of an ink was measured with a concentrated system particle size analyzer FPAR-1000 (manufactured by Otsuka Electronics Co., Ltd.).

Example 16

The dispersant 1 (10 parts by mass), copper particles QSI-NANO COPPER POWDER (manufactured by Quantum Sphere Inc.) (40 parts by mass), and ethylene glycol monoethyl ether (100 parts by mass) were dispersed ultrasonically for 10 minutes, and then dispersed with a high-speed mixer FILMIX (manufactured by Primix Corporation) for 10 minutes. Next, coarse particles were removed therefrom with a filter having a pore diameter of 1 μm, to thereby obtain an ink having an average particle diameter of 68 nm.

Example 17

An ink having an average particle diameter of 69 nm was obtained in the same manner as in Example 16, except that the dispersant 2 (2 parts by mass) and diethylene glycol monoethyl ether were used instead of the dispersant 1 (10 parts by mass) and ethylene glycol monoethyl ether of Example 16.

Example 18

An ink having an average particle diameter of 87 nm was obtained in the same manner as in Example 16, except that the dispersant 3 (10 parts by mass) and triethylene glycol dimethyl ether were used instead of the dispersant 1 (10 parts by mass) and ethylene glycol monoethyl ether of Example 16.

Example 19

An ink having an average particle diameter of 79 nm was obtained in the same manner as in Example 16, except that the dispersant 4 (10 parts by mass) and diethylene glycol monobutyl ether acetate were used instead of the dispersant 1 (10 parts by mass) and ethylene glycol monoethyl ether of Example 16.

Example 20

An ink having an average particle diameter of 69 nm was obtained in the same manner as in Example 16, except that the dispersant 5 and diethylene glycol monobutyl ether were used instead of the dispersant 1 and ethylene glycol monoethyl ether of Example 16.

Example 21

An ink having an average particle diameter of 81 nm was obtained in the same manner as in Example 16, except that the dispersant 6 (2 parts by mass) and tripropylene glycol monomethyl ether were used instead of the dispersant 1 (10 parts by mass) and ethylene glycol monoethyl ether of Example 16.

Example 22

An ink having an average particle diameter of 75 nm was obtained in the same manner as in Example 16, except that the dispersant 7 (10 parts by mass) and ethylene glycol monopropyl ether were used instead of the dispersant 1 (10 parts by mass) and ethylene glycol monoethyl ether of Example 16.

Example 23

An ink having an average particle diameter of 83 nm was obtained in the same manner as in Example 16, except that the dispersant 8 (10 parts by mass) and propylene glycol monophony ether were used instead of the dispersant 1 (10 parts by mass) and ethylene glycol monoethyl ether of Example 16.

Example 24

An ink having an average particle diameter of 78 nm was obtained in the same manner as in Example 16, except that the dispersant 9 (2 parts by mass) and diethylene glycol monoethyl ether acetate were used instead of the dispersant 1 (10 parts by mass) and ethylene glycol monoethyl ether of Example 16.

Example 25

An ink having an average particle diameter of 84 nm was obtained in the same manner as in Example 16, except that the dispersant 10 (10 parts by mass) and diethylene glycol diethyl ether were used instead of the dispersant 1 (10 parts by mass) and ethylene glycol monoethyl ether of Example 16.

Example 26

An ink having an average particle diameter of 68 nm was obtained in the same manner as in Example 16, except that the dispersant 11 (10 parts by mass) and diethylene glycol monomethyl ether were used instead of the dispersant 1 (10 parts by mass) and ethylene glycol monoethyl ether of Example 16.

Example 27

An ink having an average particle diameter of 70 nm was obtained in the same manner as in Example 16, except that the dispersant 12 (10 parts by mass) was used instead of the dispersant 1 (20 parts by mass) of Example 16.

Example 28

An ink having an average particle diameter of 82 nm was obtained in the same manner as in Example 16, except that the dispersant 13 (2 parts by mass) and diethylene glycol monoethyl ether were used instead of the dispersant 1 (10 parts by mass) and ethylene glycol monoethyl ether of Example 16.

Example 29

An ink having an average particle diameter of 73 nm was obtained in the same manner as in Example 16, except that the dispersant 14 (10 parts by mass) and triethylene glycol dimethyl ether were used instead of the dispersant 1 (10 parts by mass) and ethylene glycol monoethyl ether of Example 16.

Example 30

An ink having an average particle diameter of 78 nm was obtained in the same manner as in Example 16, except that the dispersant 15 (10 parts by mass) and diethylene glycol monobutyl ether acetate were used instead of the dispersant 1 (10 parts by mass) and ethylene glycol monoethyl ether of Example 16.

Comparative Example 1

An ink having an average particle diameter of 90 nm was obtained in the same manner as in Example 16, except that polyvinyl pyrrolidone and ethylene glycol were used instead of the dispersant 1 and ethylene glycol monoethyl ether of Example 16.

Comparative Example 2

An ink having an average particle diameter of 125 nm was obtained in the same manner as in Example 16, except that polyvinyl alcohol and isopropyl alcohol were used instead of the dispersant 1 and ethylene glycol monoethyl ether of Example 16.

Next, electro-conductive patterns (calcinated by heat and calcinated by light) were formed as described below with each of the produced inks, and the volume resistivity thereof was measured. The results are shown in Table 2.

<Formation of Electro-Conductive Pattern (1) (Heat Calcination)>

The ink was applied on a glass substrate by spin coating, and then the dispersion medium was evaporated therefrom with a hot plate of 120° C. Next, the resultant was heated at 300° C. for 1 hour with an electric furnace in which nitrogen was flowed, to thereby form an electro-conductive pattern (1) (an electro-conductive thin film). Next, the electric resistance and the thickness of the electro-conductive pattern (1) (calcinated by heat) were measured with a resistivity meter (LORESTA manufactured by Mitsubishi Chemical Corporation), and a profilometer (ALPHA-STEP manufactured by KLA Tencor Corporation), and the volume resistivity thereof was calculated.

<Formation of Electro-Conductive Pattern (2) (Light Calcination)>

The ink was patterned onto an ink receiving layer-including film (OHP sheet) with an inkjet coater (manufactured by Ricoh Printing Systems, Inc.), and then the dispersion medium was evaporated therefrom with a hot plate of 120° C. Next, the resultant was irradiated with light for 1 minute with a xenon lamp, to thereby form an electro-conductive pattern (2). Next, the electric resistance and the thickness of the electro-conductive pattern (2) were measured with a resistivity meter (LORESTA manufactured by Mitsubishi Chemical Corporation), and a profilometer (ALPHA-STEP manufactured by KLA Tencor Corporation), and the volume resistivity thereof was calculated.

TABLE 2

|  | Dispersant | Dispersion medium | Ink average particle diameter (nm) | Volume resistivity ($\Omega \cdot cm$) | |
|---|---|---|---|---|---|
|  |  |  |  | Heat calcination | Light calcination |
| Ex. 16 | 1 | Ethylene glycol monoethyl ether | 68 | $1 \times 10^{-5}$ | $5 \times 10^{-6}$ |
| Ex. 17 | 2 | Diethylene glycol monoethyl ether | 69 | $2 \times 10^{-5}$ | $1 \times 10^{-5}$ |
| Ex. 18 | 3 | Triethylene glycol dimethyl ether | 87 | $2 \times 10^{-5}$ | $9 \times 10^{-6}$ |
| Ex. 19 | 4 | Diethylene glycol monobutyl ether acetate | 79 | $1 \times 10^{-5}$ | $7 \times 10^{-6}$ |
| Ex. 20 | 5 | Diethylene glycol monobutyl ether | 69 | $1 \times 10^{-5}$ | $5 \times 10^{-6}$ |
| Ex. 21 | 6 | Tripropylene glycol monomethyl ether | 81 | $1 \times 10^{-5}$ | $8 \times 10^{-6}$ |
| Ex. 22 | 7 | Ethylene glycol monopropyl ether | 75 | $1 \times 10^{-5}$ | $8 \times 10^{-6}$ |
| Ex. 23 | 8 | Propylene glycol monophenyl ether | 83 | $2 \times 10^{-5}$ | $1 \times 10^{-5}$ |
| Ex. 24 | 9 | Diethylene glycol monoethyl ether acetate | 78 | $1 \times 10^{-5}$ | $7 \times 10^{-6}$ |
| Ex. 25 | 10 | Diethylene glycol diethyl ether | 84 | $2 \times 10^{-5}$ | $9 \times 10^{-6}$ |
| Ex. 26 | 11 | Diethylene glycol monomethyl ether | 68 | $1 \times 10^{-5}$ | $6 \times 10^{-6}$ |
| Ex. 27 | 12 | Ethylene glycol monoethyl ether | 70 | $1 \times 10^{-5}$ | $8 \times 10^{-6}$ |
| Ex. 28 | 13 | Diethylene glycol monoethyl ether | 82 | $2 \times 10^{-5}$ | $1 \times 10^{-5}$ |
| Ex. 29 | 14 | Triethylene glycol dimethyl ether | 73 | $1 \times 10^{-5}$ | $8 \times 10^{-6}$ |
| Ex. 30 | 15 | Diethylene glycol monobutyl ether acetate | 78 | $2 \times 10^{-5}$ | $9 \times 10^{-6}$ |
| Comp. Ex. 1 | Polyvinyl pyrrolidone | Ethylene glycol | 90 | $8 \times 10^{-3}$ | $4 \times 10^{-2}$ |
| Comp. Ex. 2 | Polyvinyl alcohol | Isopropyl alcohol | 125 | $5 \times 10^{-2}$ | $1 \times 10^{-1}$ |

From the results shown in Table 2, it was revealed that the inks of Examples 16 to 30 made the volume resistivity of the electro-conductive thin film or pattern low regardless of whether they were calcinated by heat or calcinated by light.

It was revealed that the ink of Comparative Example 1, on the other hand, made the volume resistivity of the electro-conductive thin film or pattern high regardless of whether it was calcinated by heat or calcinated by light, because the dispersion medium of the ink did not compose well and could not be calcinated sufficiently. Here, light calcination made the volume resistivity of the electro-conductive thin film or pattern high more remarkably.

It was also revealed that the ink of Comparative Example 2 made the volume resistivity of the electro-conductive thin film or pattern high regardless of whether it was calcinated by heat or calcinated by light, because when applied, it could not form well a film in which the metal particles were deposited densely. Here, light calcination made the volume resistivity of the electro-conductive film or pattern high more remarkably.

Aspects of the present invention are as follows, for example.

<1> A dispersant used for dispersion of metal particles, including:
a constituent unit derived from a compound represented by General Formula (I) below; and
a constituent unit derived from a compound having an ionic group,

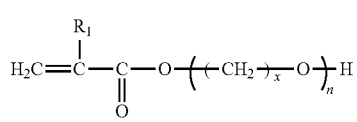
<General Formula (I)> where in General Formula (I) above, $R_1$ is a hydrogen atom or a methyl group, x is a natural number of 2 or greater, and n is a natural number of 1 or greater.

<2> The dispersant according to <1>,
wherein in General Formula (I), n is 1, and x is from 2 to 12.

<3> The dispersant according to <1>,
wherein in General Formula (I), n is a natural number of 2 or greater, and x is 2 or 3.

<4> The dispersant according to any one of <1> to <3>,
wherein the ionic group of the compound having an ionic group is at least any selected from an amino group, a carboxyl group, a sulfo group, and a phospho group.

<5> A method for producing a dispersant used for dispersion of metal particles, including;
polymerizing a composition including a compound represented by General Formula (I) below and a compound having an ionic group,

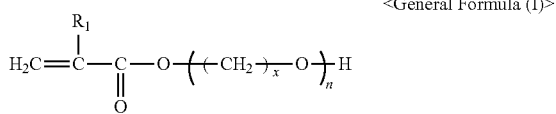

where in General Formula (I) above, $R_1$ is a hydrogen atom or a methyl group, x is a natural number of 2 or greater, and n is a natural number of 1 or greater.

<6> An ink used for formation of an electro-conductive pattern, including:
the dispersant according to any one of <1> to <4>;
metal particles; and
a dispersion medium.

<7> The ink according to <6>,
wherein the dispersion medium includes at least one selected from monoalkyl glycol ether, glycol monoalkyl ether ester, and dialkyl glycol ether.

<8> A method for forming an electro-conductive pattern, including:
applying the ink according to <6> or <7> on a substrate; and
calcinating the ink applied on the substrate.

<9> The method for forming an electro-conductive pattern according to <8>,
wherein the calcination calcinates the ink applied on the substrate by light.

This application claims priority to Japanese application No. 2013-188299, filed on Sep. 11, 2013 and incorporated herein by reference, and Japanese application No. 2014-141448, filed on Jul. 9, 2014 and incorporated herein by reference.

What is claimed is:

1. An ink, comprising:
a dispersant;
metal particles; and
a dispersion medium,
wherein:
the ink is adapted to function as an ink for forming an electro-conductive pattern;
the dispersion medium consists of at least one organic solvent selected from the group consisting of a monoalkyl glycol ether, a glycol monoalkyl ether ester, and a dialkyl glycol ether;
the dispersant is a copolymer comprising:
(A) a constituent unit derived from a compound represented by General Formula (I) below:

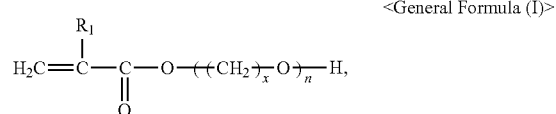

and
(B) a constituent unit derived from a compound comprising an ionic group, and wherein:

the dispersant is adapted to function as a dispersant for dispersing metal particles;
$R_1$ is a hydrogen atom or a methyl group;
x is 2 or 3;
n is a natural number of 2 or greater; and
a molar ratio of (A) to (B) is from 9 to 999.

2. The ink according to claim 1, wherein the dispersion medium consists of at least one selected from the group consisting of a glycol monoalkyl ether ester, and a dialkyl glycol ether.

3. The ink according to claim 1, wherein the molar ratio of (A) to (B) is from 20 to 100.

4. The ink according to claim 1, wherein a molecular weight of the dispersant is from 5,000 to 100,000 g/mol.

5. The ink according to claim 1, wherein the ionic group comprises at least one member selected from the group consisting of an amino group, a carboxyl group, a sulfo group, and a phospho group.

6. The ink according to claim 1, wherein the dispersant is present in the ink in an amount of from 1 to 20 parts by mass per 100 parts by mass of the dispersion medium.

7. The ink according to claim 3, wherein the dispersion medium consists of at least one organic solvent selected from the group consisting of a glycol monoalkyl ether ester, and a dialkyl glycol ether.

8. The ink according to claim 1, wherein the dispersion medium consists of at least one organic solvent selected from the group consisting of ethylene glycol monomethyl ether; ethylene glycol monoethyl ether; ethylene glycol monopropyl ether; ethylene glycol monobutyl ether; ethylene glycol monohexyl ether; ethylene glycol mono-2-ethyl butyl ether; diethylene glycol monomethyl ether; diethylene glycol monoethyl ether; diethylene glycol monopropyl ether; diethylene glycol monobutyl ether; diethylene glycol monohexyl ether; propylene glycol monomethyl ether, propylene glycol monoethyl ether; propylene glycol monopropyl ether; propylene glycol monobutyl ether; dipropylene glycol monomethyl ether; dipropylene glycol monoethyl ether; dipropylene glycol monopropyl ether; tripropylene glycol monomethyl ether; tripropylene glycol monobutyl ether; diethylene glycol monomethyl ether acetate; diethylene glycol monoethyl ether acetate; diethylene glycol monobutyl ether acetate; ethylene glycol dimethyl ether; ethylene glycol diethyl ether; diethylene glycol dimethyl ether; triethylene glycol dimethyl ether; tetraethylene glycol dimethyl ether; and dipropylene glycol dimethyl ether.

9. The ink according to claim 1, wherein the metal particles comprise at least one of copper particles, silver particles, and nickel particles.

10. The ink according to claim 1, wherein:
the metal particles comprise at least one of copper particles, silver particles, and nickel particles; and
an average particle diameter of the metal particles is from 2 nm to 100 nm.

11. The ink according to claim 1, wherein:
the metal particles comprise at least one of copper particles, silver particles, and nickel particles; and
an average particle diameter of the metal particles is from 5 nm to 50 nm.

* * * * *